United States Patent [19]
Walter et al.

[11] 3,734,073
[45] May 22, 1973

[54] ADJUSTABLE CAMSHAFT SPROCKET WHEEL

[76] Inventors: Robert L. Walter, 19361 Lake Chabot Road, Castro Valley; Earl L. Kelly, 1826 Buena Vista, Livermore, both of Calif. 94550

[22] Filed: June 1, 1971

[21] Appl. No.: 148,648

[52] U.S. Cl. ................................. 123/90.15, 74/395
[51] Int. Cl. ........................... F01l 1/34, F16h 35/06
[58] Field of Search .................... 123/90.15; 74/395

[56] References Cited
UNITED STATES PATENTS

| | | | |
|---|---|---|---|
| 1,040,063 | 10/1912 | Wall | 74/395 |
| 953,424 | 3/1910 | Lindsay | 123/90.15 |
| 1,691,408 | 11/1928 | Palmer | 74/395 |
| 3,369,418 | 2/1968 | Young | 123/90.15 |
| 3,415,137 | 12/1968 | Casale | 74/395 |

Primary Examiner—Martin P. Schwadron
Assistant Examiner—A. M. Zupcic
Attorney—Robert R. Tipton

[57] ABSTRACT

A timing sprocket for a camshaft is provided with a number of positioning holes equally spaced in a circle about its axis of rotation. A vernier plate connected to the camshaft is provided with alignment holes equally spaced in a corresponding circle as the circle of positioning holes but at a slightly greater or lesser angle. Alignment of a positioning hole and an alignment hole using a positioning pin permits incremental rotational adjustment of the sprocket wheel relative to the camshaft for angular increments equal to the difference between the angles of the positioning holes and the angles of the alignment holes.

6 Claims, 3 Drawing Figures

PATENTED MAY 22 1973 3,734,073

INVENTOR.
ROBERT L. WALTER
EARL L. KELLY
BY
Robert R. Tipton

ADJUSTABLE CAMSHAFT SPROCKET WHEEL

BACKGROUND OF THE INVENTION

This invention relates generally to internal combustion engines and in particular to apparatus for adjusting the timing of camshafts.

The timing of the opening and closing of intake and exhaust valves in an internal combustion engine is critical to the proper performance of the engine at various engine speeds. In order to assure maximum power and efficiency at a particular engine speed, the valve must be timed to open and close at a particular moment.

This timing is accomplished normally by using a sprocket wheel which is attacked to the camshaft. The sprocket wheel is connected to the engine crankshaft either through a series of gears or a sprocket chain. In most cases, the angular position of the sprocket wheel relative to the camshaft and the crankshaft is fixed at the factory using a positioning dowel pin so that the opening and closing of the valves are timed for an optimum engine speed and a particularly designed camshaft. If a different timing is desired or a different camshaft is used, a new sprocket wheel is required having a different angular setting of its sprocket teeth relative to the positioning dowel pin.

SUMMARY OF THE INVENTION

The apparatus of the present invention eliminates the need for extra sprocket wheels in that it comprises a sprocket wheel assembly in which the rotation of the sprocket wheel relative to the camshaft can be adjusted in predetermined angular increments so that the timing of the opening and closing of the engine valves can be adjusted to obtain the desired engine performance.

It is, therefore, an object of the present invention to provide an adjustable sprocket wheel assembly.

It is another object of the present invention to provide a sprocket wheel assembly which is adjustable in predetermined angular increments.

It is a further object of the present invention to provide a sprocket wheel for an internal combustion engine camshaft that is adjustable in angular rotation relative to the camshaft.

These and other objects of the present invention will become manifest upon study of the following specification when taken together with the drawings.

DESCRIPTION OF THE PREFERRED EMBODIMENT

Figure 1:
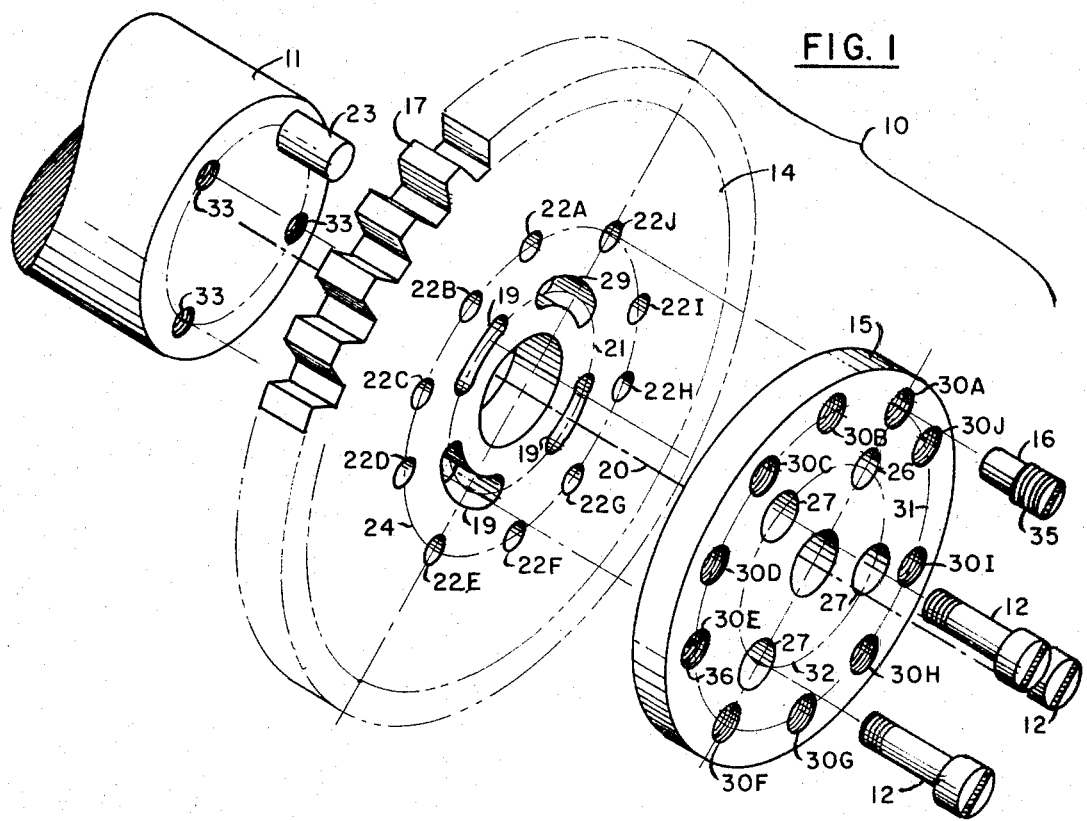
FIG. 1 is an isometric exploded view of the apparatus of the present invention.

With reference to FIG. 1, the apparatus of the present invention comprises a timing sprocket assembly 10 connected to the end of camshaft 11 by machine screws or bolts 12.

Timing sprocket assembly 10 comprises sprocket wheel 14 on the face of which is connected vernier plate 15 using vernier plate index alignment positioning pin 16 to adjust angular rotation of sprocket wheel 14 as hereinafter described.

Camshaft 11 is a camshaft typical of that used on any reciprocating piston internal combustion engine which uses cam valve lifters (not shown) common in the art. Teeth 17 of sprocket wheel 14 are adapted to receive either a sprocket chain (not shown) or gears (not shown) of a typical internal combustion engine (not shown), all of which are well known and common in the art and for that reason are not illustrated in the drawings.

Figure 2:
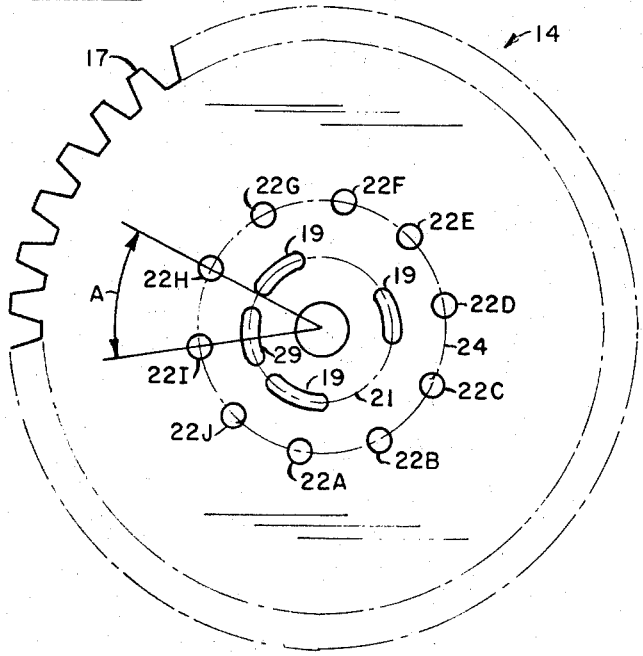
FIG. 2 is an elevational view of a typical sprocket wheel of the present invention.

With reference to FIG. 2, there is illustrated an elevational view of a typical sprocket wheel 14 as used on the apparatus of the present invention which is provided with curved clearance slots 19 disposed in a circle 21 about axis of rotation 20 of sprocket wheel 14, and a group of positioning holes 22 individually identified as holes 22A through 22J, inclusive, also disposed in a circle 24 about axis of rotation 20.

Curved slots 19 are positioned and adapted to receive machine screws or bolts 12 and cam reference positioning dowel pin 23 (FIG. 1), while at the same time permitting sprocket wheel 14 to rotate, limited by the arc length of slots 19, about its axis of rotation 20. It will be noted that slots 19 are arranged with their centerlines of curvature defining a slot circle 21.

For the embodiment of sprocket wheel 14 illustrated in FIG. 2, positioning holes 22A through 22J are arranged with their centers defining a circle 24 having its center concentric with axis 20. Positioning holes 22A through 22J are arranged in FIG. 2 with each hole spaced at equal angular intervals "A" of 36° about circle 24.

Figure 3:
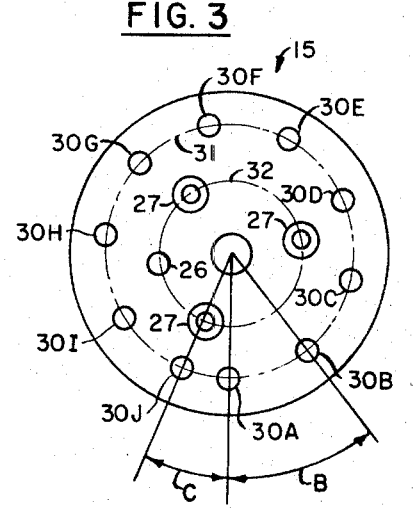
FIG. 3 is an elevational view of a typical vernier plate of the present invention.

With reference to FIG. 3, there is illustrated a typical vernier plate 15 comprising a camshaft reference dowel pin hole 26 for index referencing the positioning of vernier plate 15 to camshaft 11, screw fastener holes 27 for connecting vernier plate 15 to camshaft 11 and alignment holes 30A through 30J.

Alignment holes 30A through 30J are arranged with their centers defining a circle 31 having its center concentric with axis 20 and its diameter equal to that of positioning hole circle 24. Alignment holes 30A through 30J in vernier plate 15, however, as distinguished from positioning holes 22A through 22J in sprocket wheel 14, are each spaced at an angular interval "B" of 37° about circle 31 with the exception of angle "C" between holes 30A and 30J which is 27° to make up the difference for the 360° of the circle.

Bolt holes 27 are arranged in vernier plate 15 to define a machine screw or bolt circle 32 having a diameter equal to slot circle 21 in sprocket wheel 14 (FIG. 2) and positioned to permit bolts 12 to pass through slots 19 in order to engage threaded holes 33 in the end of camshaft 11. A slot 29 is also arranged to permit cam positioning reference dowel pin 23 to pass therethrough and be received by camshaft reference dowel pin hole 26.

To operate the device of the present invention, timing sprocket assembly 10 is connected to camshaft 11, as shown in the exploded view of FIG. 1, by placing sprocket wheel 14 against the end of camshaft 11 so that dowel pin 23 projects through slot 29 with the slots 19 placed over threaded holes 33 in camshaft 11.

Vernier plate 15 is then placed on the outside end of sprocket wheel 14 so that referencing dowel pin 23 will be received by hole 26 with bolt or screw fastener holes 27 positioned over curved slots 19. Bolts, or machine screw fasteners 12 are then inserted into holes 27 through slots 19 where they are caused to engage threaded holes 33 in camshaft 11.

While bolts 12 are still loose, sprocket wheel 14 can be rotated clockwise or counter-clockwise an arc length equal to the centerline arc length of curved slots 19 and 29.

To adjust or set the angle of wheel 14, index alignment positioning pin 16 is placed in one of the alignment holes 30, for example, 30A.

Alignment pin 16 is provided with threads 35 at its upper end which are adapted to engage threads 36 in any of the alignment holes 30A – 30J. The lower end of pin 16 is a straight cylinder adapted to fit any of the positioning holes 22A – 22J.

Sprocket wheel 14 is then rotated until positioning hole 22A is aligned with alignment hole 30A permitting pin 16 to engage both holes and hold wheel 14 fixed relative to plate 15. Bolts 12 are then tightened and timing assembly 10 is ready for operation.

Since vernier plate 15 is attached to camshaft 11, the position of sprocket wheel 14 is thus fixed relative to camshaft 11.

To change the angular setting of wheel 14 relative to camshaft 11, bolts 12 are loosened and pin 16 is removed.

To rotate wheel 14 back 1 angular °, pin 16 is inserted in alignment hole 30B and wheel 14 is rotated back (counterclockwise) until positioning hole 22B is aligned with alignment hole 30B permitting pin 16 to engage both holes and hold wheel 14 fixed relative to plate 15. Bolts 12 are then tightened and timing sprocket assembly 10 is ready for operation.

If it is desired to rotate wheel 14 back 2°, pin 16 is inserted in alignment hole 30C and positioning hole 22C.

If it is desired to rotate wheel 14 back 9°, pin 16 is inserted in alignment hole 30J and positioning hole 22J.

Thus, since holes 22A – 22J in wheel 14 are located at 36° intervals and holes 30A – 30J in vernier plate 15 are located at 37° intervals, by aligning corresponding holes, wheel 14 can be adjusted in its rotation relative to camshaft 11 in 1° increments, or the difference in angle between the angular spacing of holes 22A – 22J in wheel 14 and the angular spacing of holes 30A – 30J in vernier plate 15.

If other incremental differences are desired, for example, ½° increments, the difference in angle between positioning holes 22 and alignment holes 30 would be ½°.

The same would be true if, for example, 2° increments would be desired. The difference in angle between positioning holes 22 and alignment holes 30 would be 2°.

A different configuration may also be used in which vernier plate 15 is attached directly to the end of camshaft 11 as by welding, brazing or the like. Sprocket wheel 14 is placed over vernier plate 15 with slots 19 aligned with bolt holes 27. Bolts 12 are then inserted through slots 19 and into holes 27 and are held in place either by nuts or threads in holes 27 in vernier plate 15.

Since vernier plate 15 is attached directly to camshaft 11, no index reference dowel pin 23 is required.

It will be noted that the term "sprocket wheel" has been used throughout the disclosure. The term "gear" can be substituted for sprocket wheel since the function of the two items is the same when used in the timing device of the present invention.

We claim:

1. An adjustable timing sprocket wheel for a camshaft comprising
    a vernier plate index alignment pin,
    a sprocket wheel having a plurality of means defining positioning holes in said wheel adapted to receive said alignment pin,
    a vernier plate having a plurality of means defining alignment holes also adapted to receive said alignment pin and corresponding to said positioning holes in said sprocket wheel for incremental rotational adjustment of said sprocket wheel relative to said camshaft, and
    means for connecting said vernier plate and said sprocket wheel to said camshaft.

2. The adjustable timing sprocket as claimed in claim 1 wherein said positioning holes generally define a circle about the axis of rotation of said sprocket wheel, and each of said alignment holes is spaced an incremental difference in angle greater than the spacing of said positioning holes.

3. The adjustable timing sprocket as claimed in claim 1 wherein said positioning holes generally define a circle about the axis of rotation of said sprocket wheel, and each of said alignment holes is spaced an incremental difference in angle lesser than the spacing of said positioning holes.

4. The adjustable timing sprocket as claimed in claim 1 wherein said camshaft further comprises
    a camshaft reference dowel pin,
    said vernier plate further comprises means for engaging said dowel pin with said plate, and
    said sprocket wheel further comprises means for permitting said dowel pin to pass through said sprocket wheel and permit rotation of said sprocket wheel about the axis of rotation of said wheel and camshaft relative to said vernier plate.

5. The adjustable timing sprocket wheel as claimed in claim 1 wherein said means for connecting said vernier plate and said sprocket wheel to said camshaft comprises
    means defining a set of bolt holes in said vernier plate,
    means defining a set of slots in said sprocket wheel corresponding to said bolt holes in said vernier plate,
    a set of bolts passing through said holes and slots, and
    means for connecting said bolts to said camshaft.

6. The adjustable timing sprocket as claimed in claim 5 wherein said slots are curved to permit rotation of said sprocket wheel about its axis of rotation.

* * * * *